(12) United States Patent
Lan et al.

(10) Patent No.: US 9,841,871 B2
(45) Date of Patent: Dec. 12, 2017

(54) METHOD, SYSTEM FOR CONTROLLING DYNAMIC MAP-TYPE GRAPHIC INTERFACE AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Tzu-Hsiang Lan, New Taipei (TW); Quan-Quan Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 486 days.

(21) Appl. No.: 14/519,354

(22) Filed: Oct. 21, 2014

(65) Prior Publication Data

US 2015/0121258 A1    Apr. 30, 2015

(30) Foreign Application Priority Data

Oct. 25, 2013    (CN) .......................... 2013 1 0510065

(51) Int. Cl.
   *G06F 3/0484*    (2013.01)
   *G06F 3/0481*    (2013.01)
   *G06F 3/0488*    (2013.01)

(52) U.S. Cl.
   CPC ...... *G06F 3/04817* (2013.01); *G06F 3/04842* (2013.01); *G06F 3/04883* (2013.01); *G06F 3/04845* (2013.01); *G06F 2203/04803* (2013.01)

(58) Field of Classification Search
   CPC ............ G06F 3/04817; G06F 3/04883; G06F 3/04845; G06F 2203/04803; G06F 3/04842
   See application file for complete search history.

(56) References Cited

U.S. PATENT DOCUMENTS

| | | | | |
|---|---|---|---|---|
| 9,063,648 | B2* | 6/2015 | Jung | .................... G06F 3/04883 |
| 2011/0167389 | A1* | 7/2011 | Murakami | ............ G06F 3/0481 |
| | | | | 715/835 |
| 2014/0223339 | A1* | 8/2014 | Lan | ........................ G06F 3/0485 |
| | | | | 715/762 |
| 2014/0223341 | A1* | 8/2014 | Lan | ........................ G06F 3/0485 |
| | | | | 715/762 |

(Continued)

FOREIGN PATENT DOCUMENTS

| CN | 101957722 | 1/2011 |
|---|---|---|
| CN | 102272708 | 12/2011 |

(Continued)

*Primary Examiner* — Shen Shiau
(74) *Attorney, Agent, or Firm* — Steven Reiss

(57) ABSTRACT

A dynamic map-type graphic interface includes a number of user interface (UI) components. Each UI component is associated with one corresponding application program of the electronic device. The dynamic map-type graphic interface is a single-layer graphic interface made up of the UI components spliced together and around the center of the dynamic map-type graphic interface. A selection box to select the UI components is controlled to determine the different UI components of the dynamic map-type graphic interface via the input unit.

15 Claims, 13 Drawing Sheets

(56) References Cited

U.S. PATENT DOCUMENTS

| | | | |
|---|---|---|---|
| 2015/0074567 A1* | 3/2015 | Lan | G06F 3/0482 |
| | | | 715/763 |
| 2015/0116352 A1* | 4/2015 | Lan | G06F 3/04817 |
| | | | 345/629 |
| 2015/0153897 A1* | 6/2015 | Huang | G06F 3/0481 |
| | | | 345/173 |
| 2016/0370982 A1* | 12/2016 | Penha | G06F 17/30852 |

FOREIGN PATENT DOCUMENTS

| | | |
|---|---|---|
| TW | 200903310 | 1/2009 |
| TW | 201314670 A1 | 4/2013 |

\* cited by examiner

METHOD, SYSTEM FOR CONTROLLING DYNAMIC MAP-TYPE GRAPHIC INTERFACE AND ELECTRONIC DEVICE USING THE SAME

FIELD

The present disclosure relates to graphic user interface technologies, and particularly to a dynamic map-type graphic interface, an electronic device providing the dynamic map-type graphic interface, and a method for the electronic device to provide the dynamic map-type graphic interface.

BACKGROUND

User interfaces (UIs) are physical or virtual mediums in which a user interacts with an electronic device. Most electronic devices use graphic user interface (GUI) components supported in an operating system (OS). The GUIs of electronic devices may have many application icons, making it necessary to arrange the application icons in different layers or pages of the GUI.

BRIEF DESCRIPTION OF THE DRAWINGS

Implementations of the present technology will now be described, by way of example only, with reference to the attached figures.

DETAILED DESCRIPTION

Figure 1:
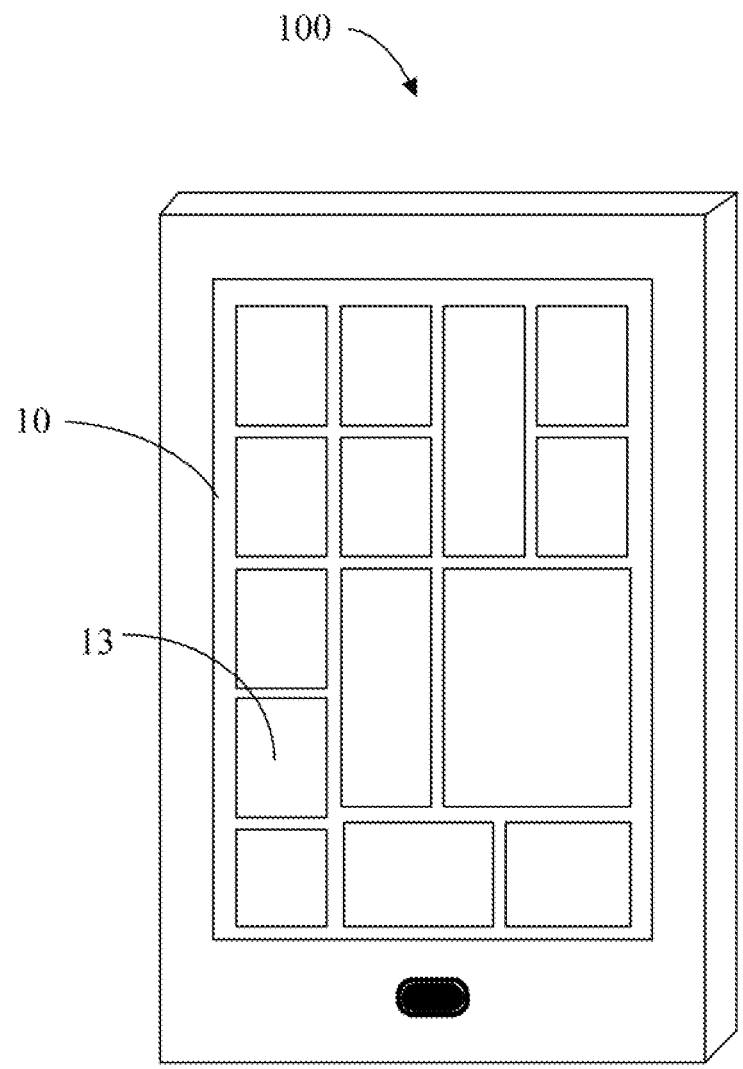
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a controlling method and a controlling system for controlling a map-type graphical user interface with a plurality of graphical representative user interface (UI) components and a selection box to select the UI components.

The controlling system comprises an input controlling module, a selection controlling module and a UI controlling module.

The input controlling module is configured to determine whether the input command input by user is a movement command, and determines an inputting direction of the movement command when the input command is the second movement command.

The selection controlling module is configured to determine a movement direction of the selection box according to the input direction of the second movement command, obtain the overlap ratio between a first UI component currently selected by the selection box and each of the second UI components adjacent to the first UI component consisting in the movement direction, and determine whether a number of the second UI components having the largest overlap ratio is more than one. The selection controlling module is further configured to determine one of the second UI components having the largest overlap ratio as the active second UI component according to a predetermined parameter, when the number of the second UI components having the largest overlap ratio is more than one; and determine the second UI component having the largest overlap ratio as the active second UI component, when the number of the second UI components having the largest overlap ratio is one.

The UI controlling module is configured to control an electronic device with the selection box by selecting the active second UI component.

Figure 2:
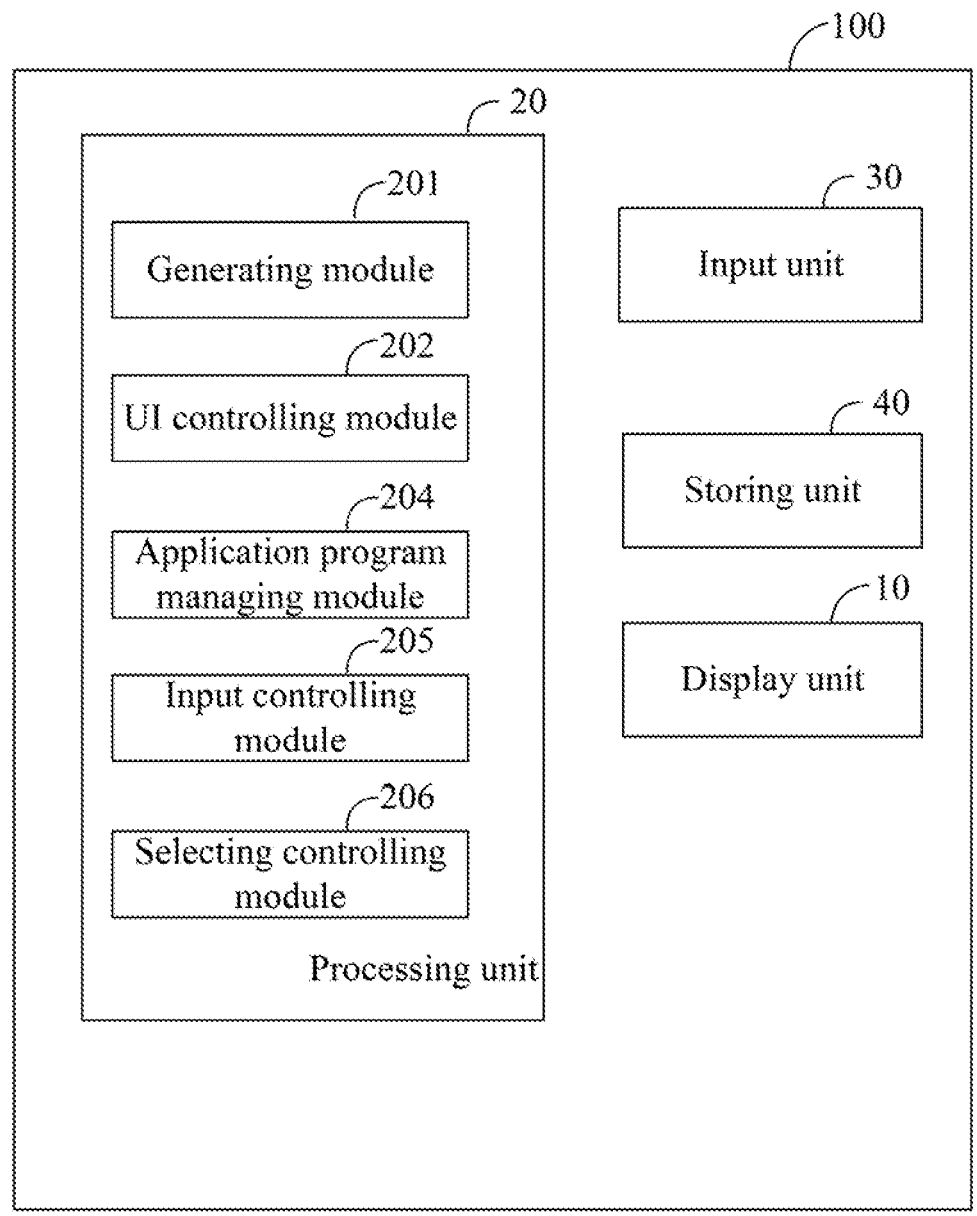
FIG. 2 is a block diagram of the electronic device of FIG. 1.

FIGS. 1 and 2 illustrate an electronic device 100 of one embodiment. The electronic device 100 includes a display unit 10, a processing unit 20, an input unit 30, and a storing unit 40. The display unit 10 of the electronic device 100 can be any size, and the electronic device 100 can be, without limitation, a television, an electronic whiteboard, a desktop personal computer, a notebook, a tablet computer, a smart phone, or a device with a display. The electronic device 100 provides a user interface (UI, not labeled) displayed on the display unit 10. A number of UI components 13 are arranged in the UI, the UI components 13 can be arranged in a single layer or in multiple layers.

In this embodiment, the storing unit 40 is a non-transitory computer-readable medium configured to store a number of documents and multimedia files, such as video files, music files, and images. The storing unit 40 further stores a number of application programs and UI components 13 associated with the application programs. The UI components 13 include application icons and different kinds of interactive widgets. Each of the application icons and widgets is associated with a corresponding application program. In at least one embodiment, the widget is a window for dynamically displaying images or information, such as weather information or time, or a thumbnail of a document, video, or image stored in the storing unit 40. In other embodiments, the widget is an interactive widget configured to provide feedback and display a processing result in response to a manual input. For example, the interactive widget is a currency converter, which includes an input box for receiving input of a currency and a currency amount, and displays a converted result.

The display unit 10 is configured to simultaneously display videos, documents, Internet web pages, interfaces of programs, a UI, and the like. The processing unit 20 is configured to run the application programs and control the display unit 10. The storing unit is further configured to store software instruments. The software instruments are run by the processing unit 20 for enabling the electronic device 100 to implement a dynamic map-type graphic interface 12 (shown in FIG. 3).

The input unit 30 can be selected from a contactless input device or a contact-type input device. The contactless input device can be a wireless control technology, such as gesture control technology or voice control technology. The contact-type input device can be a touch input device, such as a capacitive touch screen, a resistive touch screen, an Infrared touch screen, or other optical touch input devices, or other type of input device, such as a keyboard or a button.

The processing unit 20 includes a generating module 201, a UI controlling module 202, an application program managing module 204, an input controlling module 205 and a selection controlling module 206.

Figure 3:
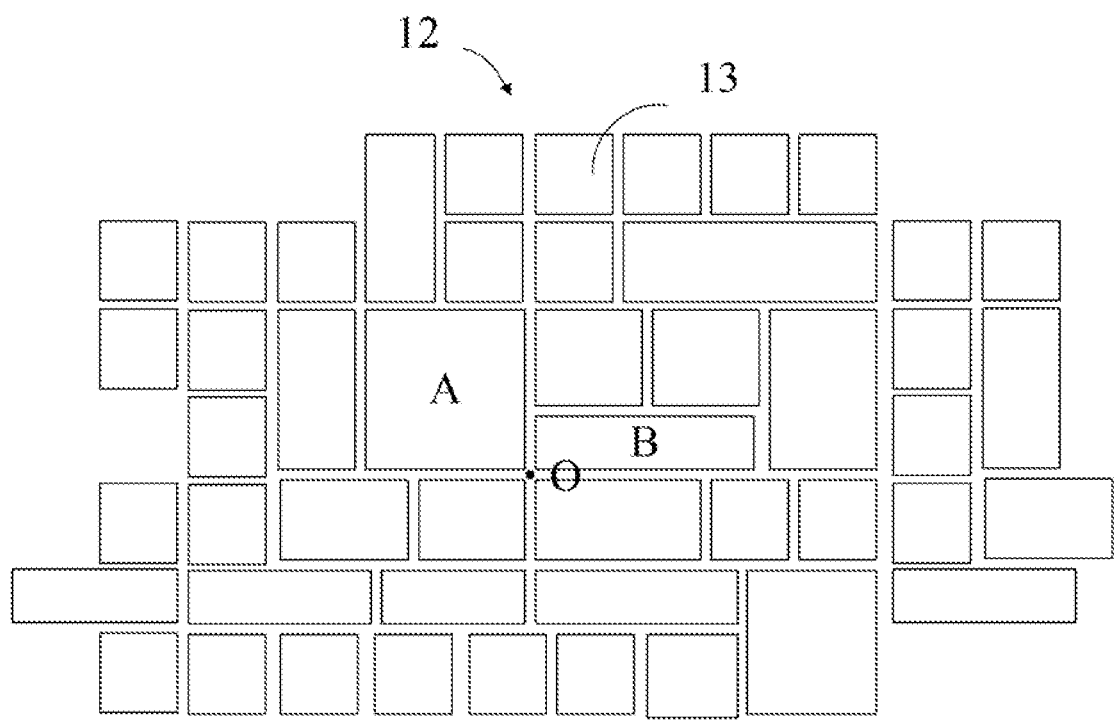
FIG. 3 is a diagrammatic view of an embodiment of a dynamic map-type graphic interface.

FIG. 3 illustrates an embodiment of a dynamic map-type graphic interface 12. The dynamic map-type graphic interface 12 is made up of the UI components 13 on a single layer. The UI components 13 are dynamically arranged according to a predetermined rule. Each of the UI components 13 is associated with one application program.

In this embodiment, the UI components 13 are arranged around a predetermined center O and spliced together to form the dynamic map-type graphic interface 12. A size of the dynamic map-type graphic interface 12 increases as the number of the UI components 13 increases. Each of the UI components 13 is a block of the map. A size, shape, and content of the block are determined by a character of the associated application program, or set by a user.

The size of the UI component 13 is measured by a predetermined unit of measurement.

In one embodiment, 1 unit is defined as 0.2 inches. For example, if the size of a UI component 13 is 1×4, the horizontal size of the UI component 13 is 0.2 inches, and the vertical size of the UI component 13 is 0.8 inches.

In another embodiment, the size of the UI component 13 is defined by pixel values. For example, if the size of the UI component 13 is 50×50, the horizontal size and the vertical size of the UI component 13 are both 50 pixels.

For example, a block A of the dynamic map-type graphic interface 12 is an application program for the weather and has a 3×3 size. Therefore, the horizontal size and the vertical size of the block A are both 0.6 inches. The content of the block A can include a static or dynamic image showing weather information of a city.

The UI components 13 are arranged around the predetermined center O according to the predetermined rule and spliced together. The UI components 13 are spliced together means that the UI components 13 are arranged around the center one by one according to the predetermined rule. The UI components 13 can be arranged closer to the center O according to a frequency of use, a time of installation, or other condition defined by a user. In other embodiments, an arrangement of the UI components 13 on the dynamic map-type graphic interface 12 is random or determined by a user.

Figure 4:
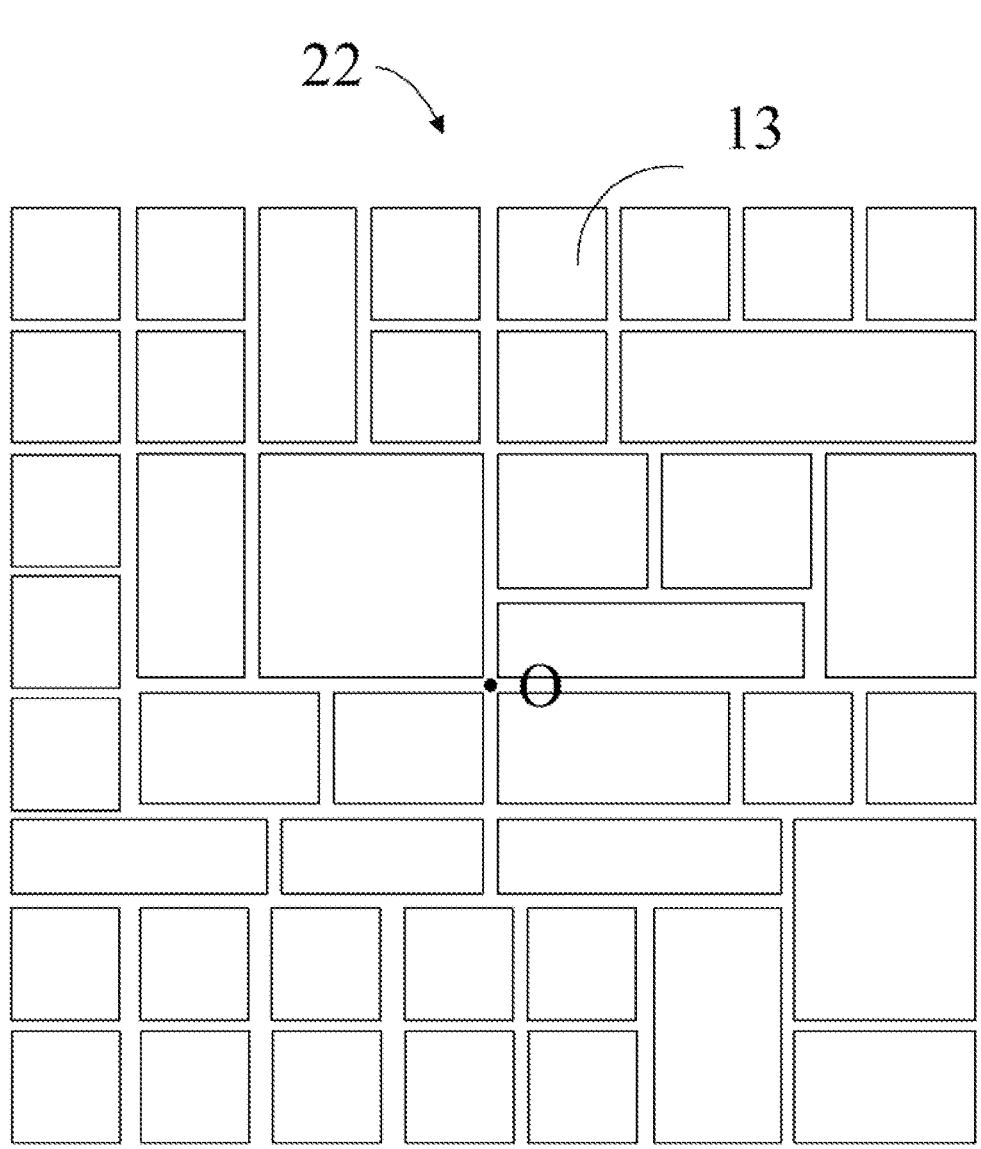
FIG. 4 is a diagrammatic view of another embodiment of a dynamic map-type graphic interface.

FIG. 4 illustrates another embodiment of a dynamic map-type graphic interface 22. A difference between the dynamic map-type graphic interface 22 and the dynamic map-type graphic interface 12 of the first embodiment is that the dynamic map-type graphic interface 22 is rectangular and has a fixed aspect ratio. As the number of the UI components 13 increases, the size of the rectangle increases to maintain the fixed aspect ratio of the dynamic map-type graphic interface 22.

Figure 5:
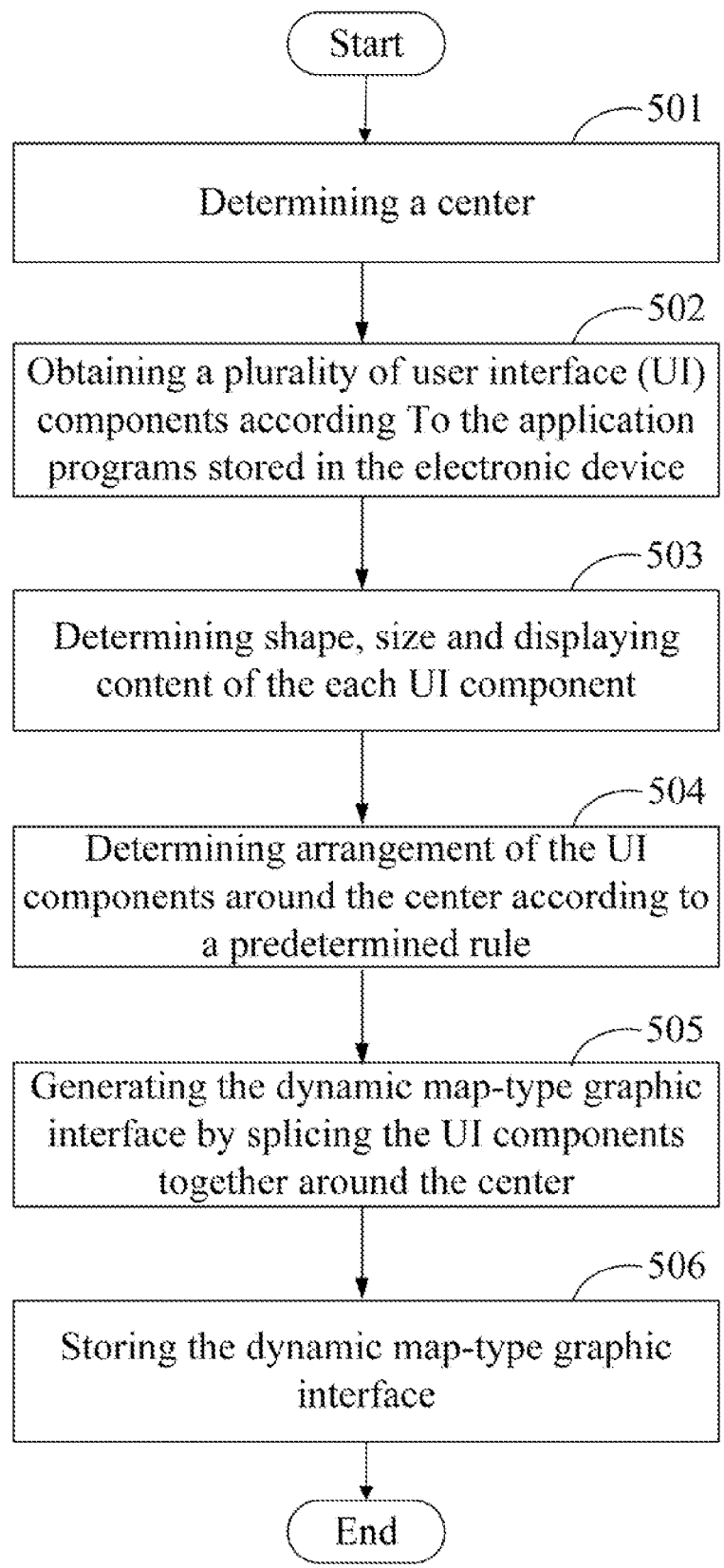
FIG. 5 is a flowchart of an embodiment of a method for providing the dynamic map-type graphic interface.

FIG. 5 illustrates a flowchart of a method for providing the dynamic map-type graphic interface 12.

In block 501, the generating module 201 determines a center O.

In block 502, the application program managing module 204 obtains the number of the UI components 13 according to the application programs stored in the electronic device 100.

In block 503, the application program managing module 204 determines the shape, size, and content of each UI component 13 according to the character of the application program associated with each UI component 13, or according to user input.

In block 504, the generating module 201 determines the arrangement of the UI components 13 around the center O according to the predetermined rule. In other embodiments, the arrangement of the UI components 13 is random or determined by a user.

In block 505, the generating module 201 generates the dynamic map-type graphic interface 12 by splicing the UI components 13 together around the center O.

In block 506, the dynamic map-type graphic interface 12 is stored in the storing unit 40 of the electronic device 100.

In other embodiments, the generating module 201 splices the UI components 13 together around the center O to form a dynamic picture.

Figure 6:
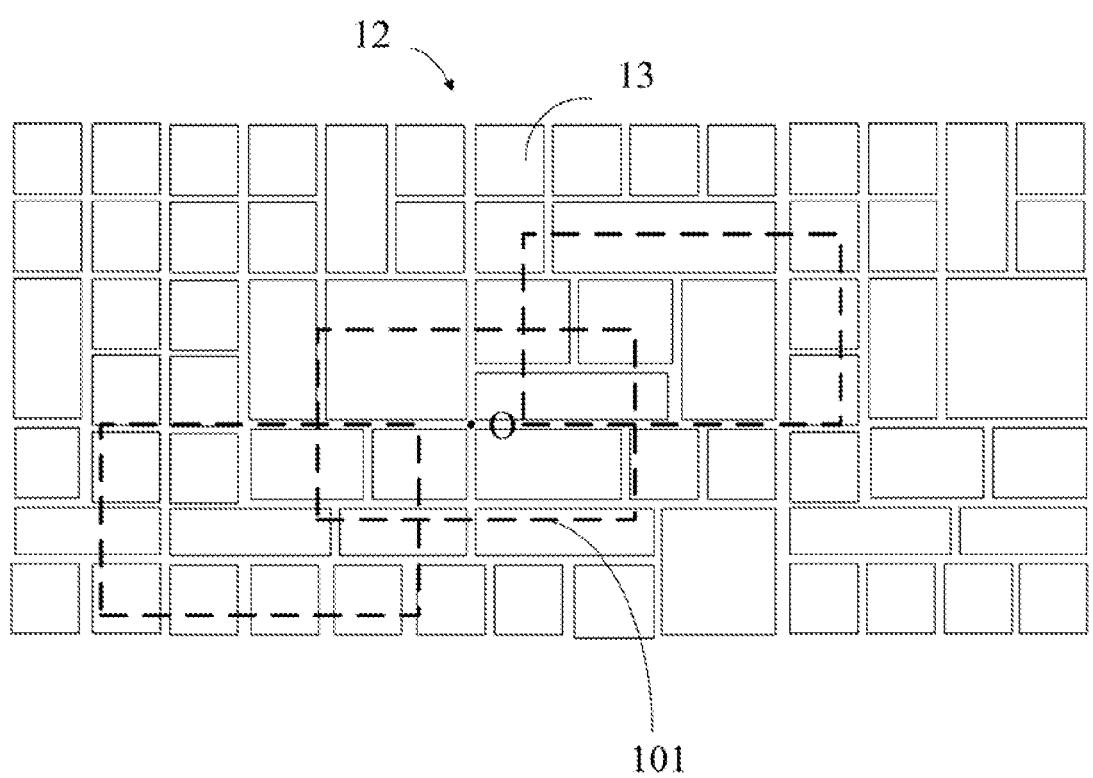
FIG. 6 is a diagrammatic view of an embodiment of a moving process of the dynamic map-type graphic user interface.

FIG. 6 illustrates when the size of the dynamic map-type graphic interface 12 is larger than a display size of the display unit 10, the UI controlling module 202 of the processing unit 20 determines a point of the dynamic map-type graphic interface 12 as a display center, then controls the display unit 10 to display a partial region 101 of the dynamic map-type graphic interface 12 centered around the display center. In this embodiment, a size of the partial region 101 is the size of the display unit 10.

In this embodiment, the center O is determined as the display center. In other embodiments, any point of the map-type graphic interface 12, such as a point O' or a point O", can be defined as the current display center. The current display center can be the most recent display center or be set by a user.

The dynamic map-type graphic interface 12 of the electronic device 100 has two controlling modes to browse.

In a first controlling mode, the UI controlling module 202 controls the display center of the dynamic map-type graphic interface 12 to move according to an input.

More detail, the input unit 30 is configured to receive an input and generate an input command in response to the input. The input controlling module 205 of the processing unit 20 generates corresponding control signals according to the different input commands. The UI controlling module 202 controls the display center of the dynamic map-type graphic interface 12 to move according to the control signal when the input command is a first movement command.

For example, as shown in FIG. 6, The UI controlling module 202 controls the display center of the dynamic map-type graphic interface 12 to move from the center O to the point O' or O", then the partial region 101 is moved accordingly to center around the point O' or the point O".

For example, if the input unit 30 is a touch panel, when the user swipes the touch panel, the input unit 30 generates the first movement command. The input controlling module 205 determines a distance and a direction of the swipe, and generates the control signal according to the first movement command. The control signal includes information of the distance and the direction of the swipe. The UI controlling module 202 determines a movement distance and a movement direction according to the control signal, and controls the display center of the dynamic map-type graphic interface 12 to move according to the determined movement direction and the determined movement distance.

In one embodiment, the movement direction is the same as the swiping direction, and the movement distance is proportional to the swiping distance. For example, when the swiping distance is 0.5 cm, the determined movement distance is 1 unit.

In another embodiment, the movement direction is opposite to the swiping direction.

When the display center is adjacent to a boundary of the dynamic map-type graphic interface 12, the UI controlling module 202 redefines the display center, such that the partial region 101 is within the dynamic map-type graphic interface 12.

In other embodiments, the input controlling module 205 determines a speed and a direction of the swipe, and generates the control signal according to the first movement command. The UI controlling module 202 determines a movement distance and a movement direction according to the speed and a direction of the swipe. For example, the movement distance can be determined according to a faster swipe gesture.

Figure 7:
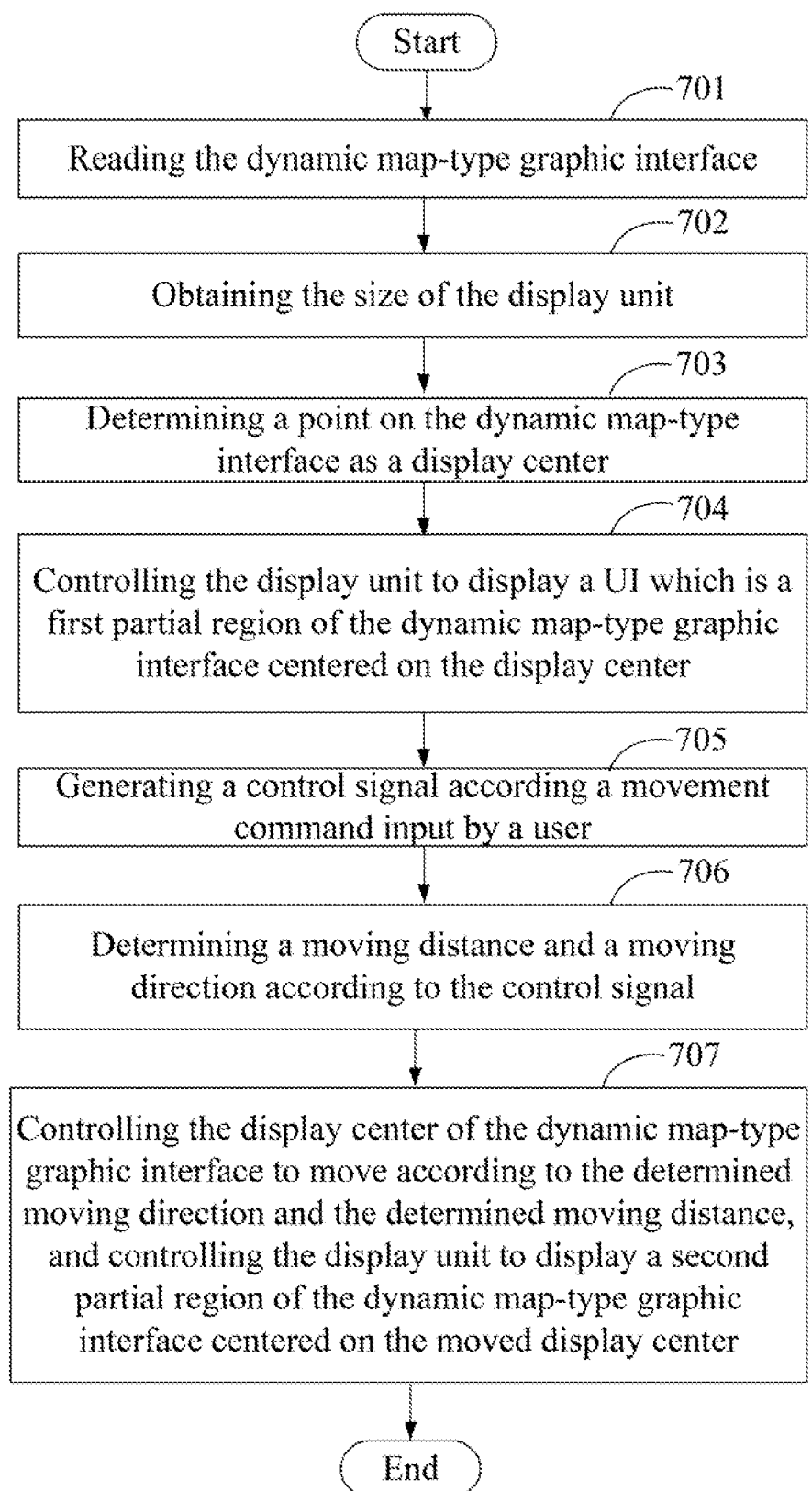
FIG. 7 is a flowchart of an embodiment of a control method for controlling a user interface of the electronic device employing the dynamic map-type graphic interface.

FIG. 7 illustrates a flowchart of a method for controlling the partial region 101 displayed on the electronic device 100.

In block 701, the UI controlling module 202 reads the dynamic map-type graphic interface 12 from the storing unit 40.

In block 702, the UI controlling module 202 obtains the size of the display unit 10. In one embodiment, the UI controlling module 202 further determines whether the size of the display unit 10 is larger than the size of the dynamic map-type graphic interface 12. If the size of the display unit 10 is larger than the size of the dynamic map-type graphic interface 12, block 703 is implemented. Otherwise, the UI controlling module 202 controls the display unit 10 to display the content of dynamic map-type graphic interface 12.

In block 703, the UI controlling module 202 determines a point on the dynamic map-type interface as a display center. In this embodiment, the UI controlling module 202 determines the center O of the dynamic map-type graphic interface 12 as the display center. In other embodiments, any point selected by a user or the most recent display center can be defined as the current display center.

In block 704, the UI controlling module 202 controls the display unit 10 to display the partial region 101 of the dynamic map-type graphic interface 12 centered around the center of the display.

In block 705, the input controlling module 205 generates a control signal according to a first movement command input.

In block 706, the UI controlling module 202 determines a movement distance and a movement direction according to the control signal.

In block 707, the UI controlling module 202 controls the display center of the dynamic map-type graphic interface 12 to move according to the determined movement direction and the determined movement distance, and controls the display unit 10 to display the partial region 101 centered around the moved display center.

When the input unit 30 is a touch panel, block 705 further includes, the input controlling module 205 determining a swiping distance and a swiping direction of the input, and generates the control signal according to the first movement command. The control signal includes information of the swiping distance and the swiping direction of the input.

Block 706 further includes the UI controlling module 202 determining the movement distance and the movement direction according to the determined swiping distance and the determined swiping direction of the input.

In other embodiments, the input unit 30 can be a non-contact type input device or a mechanical input device. The UI controlling module 202 controls the display center of the dynamic map-type graphic interface 12 to move according to different inputs.

Figure 8:
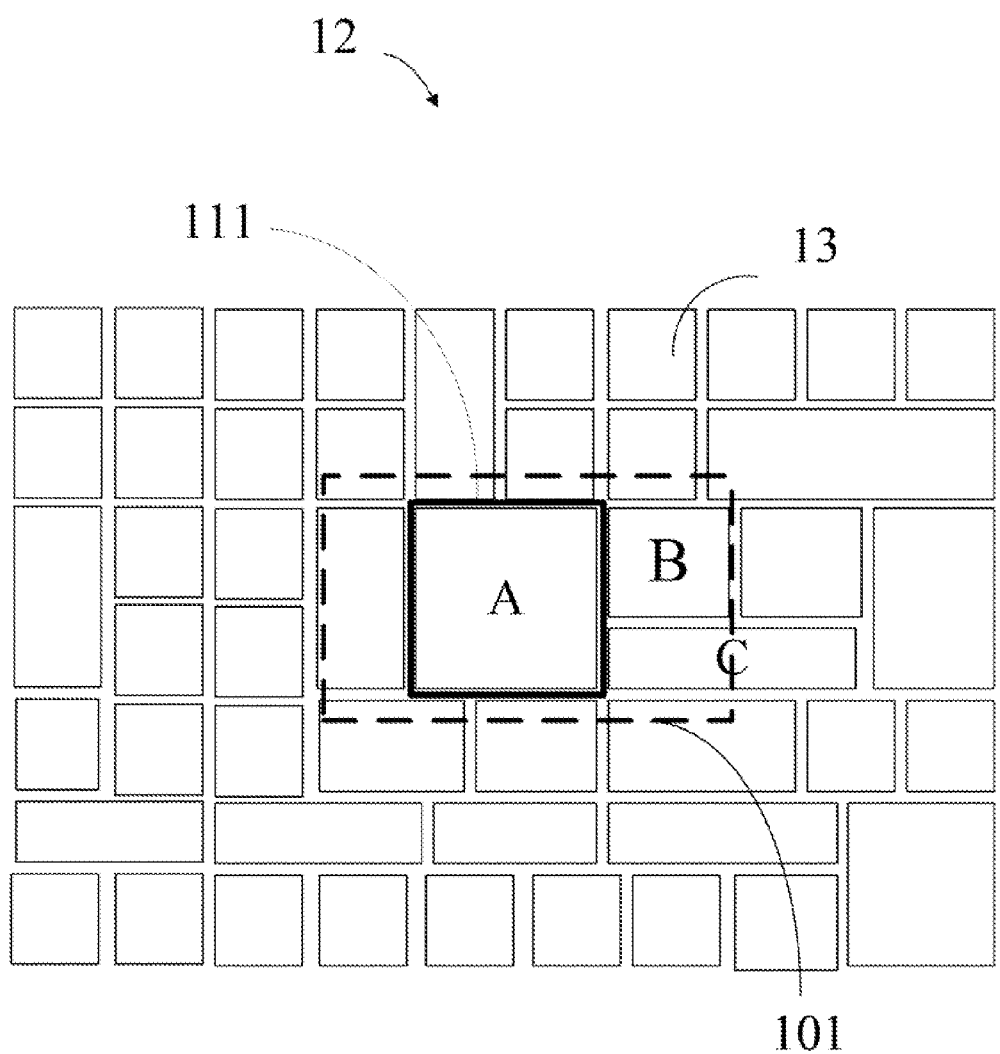
FIG. 8 is diagrammatic view of an embodiment of a dynamic map-type graphic interface having a selection box.

FIG. 8 illustrates a second controlling mode to browse the dynamic map-type graphic interface 12, in the second controlling mode, the dynamic map-type graphic interface 12 includes a selection box 111 configured to select and frame one of the UI components 13. A size and shape of the selection box 111 are coupled to the selected UI component 13, namely, the size and shape of the selection box 111 are dynamically changed during the movement on the dynamic map-type graphic interface 12. The display unit 10 displays a partial region 101 of the dynamic map-type graphic interface 12 around the display center, and the selection box 111 is also displayed on the display unit 10. User can control the selection box 111 to select the different UI components 13 of the dynamic map-type graphic interface 12 via the input unit 30.

For more detail, the input unit 30 receives an input and generates an input command in response to the input. The input command can be a confirm command or a second movement command.

The input controlling module 205 of the processing unit 20 generates a confirm signal according to the confirm command, the selection controlling module 206 controls the selection box 111 to select a confirmed UI component 13 when the input command is the confirm command. For example, if the input unit 30 is a touch screen, when the user clicks the touch screen, the input unit 30 generates the confirm command, the confirmed UI component 13 is the UI component coupled to the touch point.

The input controlling module 205 determines a movement direction according to the second movement command, the selection controlling module 206 controls the selection box 111 to select an adjacent UI component 13 consisting in the movement direction according to predetermined rules, when the input command is the second movement command.

Figure 9:
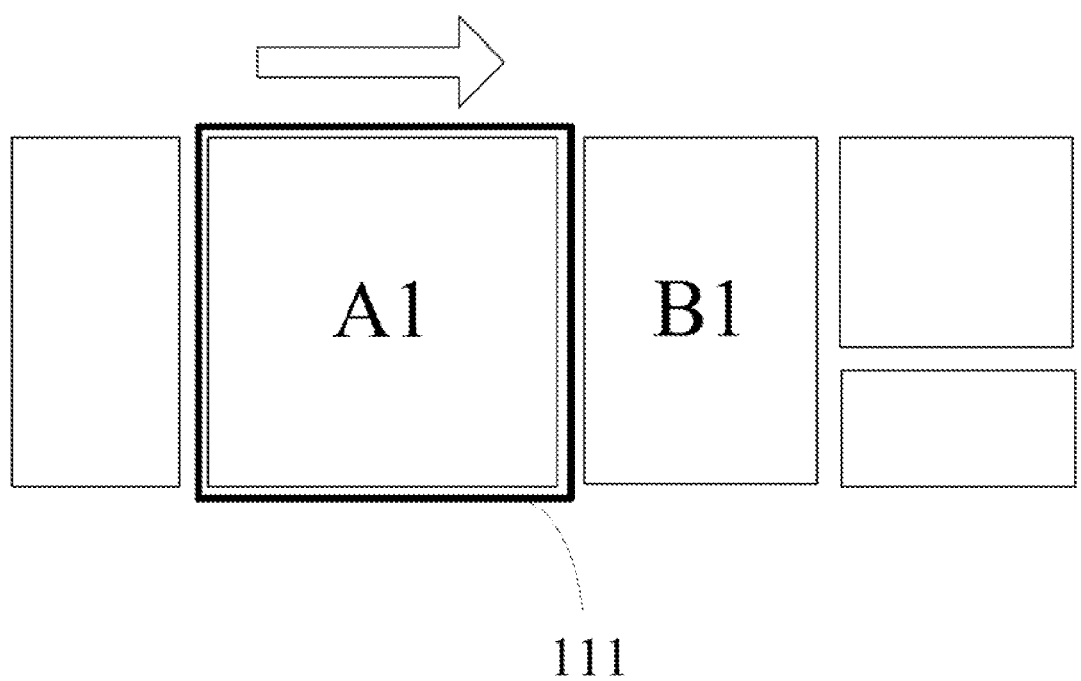
FIG. 9 is a diagrammatic view of an embodiment of a first moving process of the selection box.

FIG. 9 illustrates that in a first embodiment, the first UI component A1 is currently framed by the selection box 111, only one second UI component B1 is adjacent to the first UI component A1 in the movement direction. The selection controlling module 206 determines the second UI component B1 as an active second UI component, and controls the selection box 111 to frame the active second UI component. In an embodiment, the UI controlling module 202 controls the display center of the dynamic map-type graphic interface 12 to move to a center of the second UI component, then controls the display unit 10 to display a partial region of the dynamic map-type graphic interface 12 around the center of the active second UI component.

Figure 10:
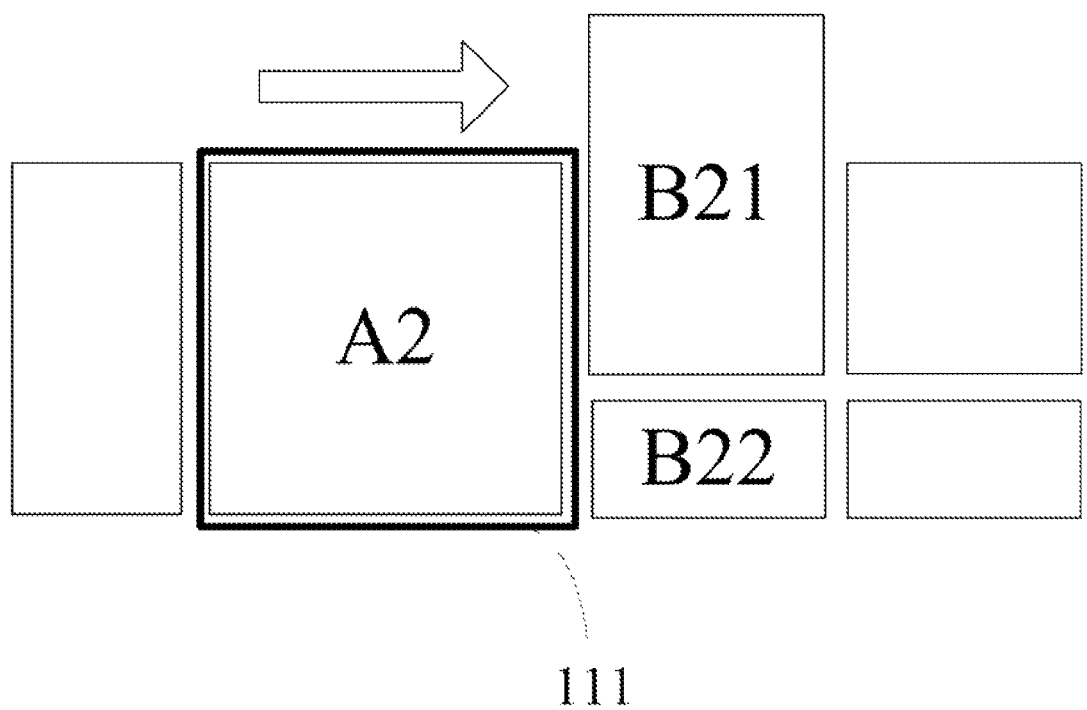
FIG. 10 is a diagrammatic view of an embodiment of a second moving process of the selection box.

FIG. 10 illustrates that in a second embodiment, the first UI component A2 is framed by the selection box 111 at present, more than one second UI components 13 are adjacent to the first UI component A2 in the movement direction. For example, as shown in FIG. 10, a second UI component B21 and a second UI component B22 are adjacent to the first UI component A2 in the movement direction. The selection controlling module 206 determines one of the second UI components as the active second UI component, according to overlap ratios between the first UI component A2 and each of the second UI components.

In details, the selection controlling module 206 obtains a length of an overlap edge of the first UI component A2 and the second UI component B21, and determines the overlap ratio between the first UI component A2 and the second UI component B21. In FIG. 10, the overlap ratio between the first UI component A2 and the second UI component B21 is about 60-70 percent.

Similarly, the selection controlling module 206 determines the overlap ratio between the first UI component A2 and the second UI component B22. As illustrated in FIG. 10, the overlap ratio between the first UI component A2 and the second UI component B22 is 100 percent.

The selection controlling module 206 further determines the second UI component B22 as the active second UI component, for the overlap ratios between the first UI component A2 and the second UI component B22 is larger.

Figure 11:
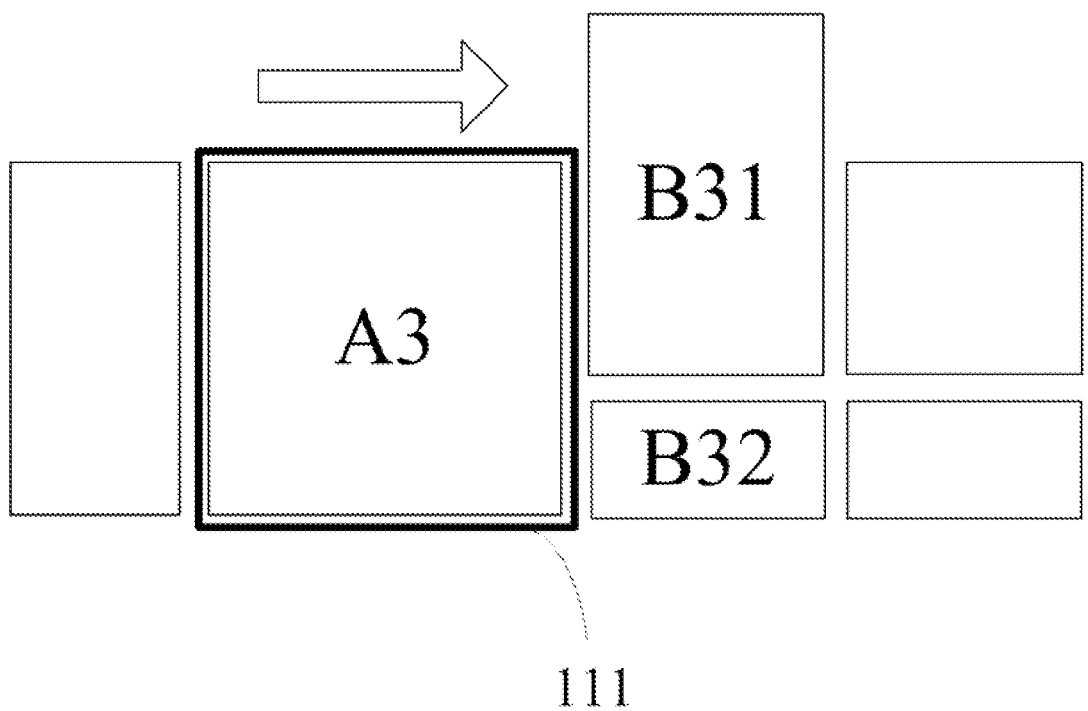
FIG. 11 is a diagrammatic view of an embodiment of a third moving process of the selection box.

FIG. 11 illustrates that in a third embodiment, the first UI component A3 is framed by the selection box 111, more than one second UI components 13 are adjacent to the first UI component A3 in the movement direction. For example, as shown in FIG. 11, a second UI component B31 and a second UI component B32 are adjacent to the first UI component A3 in the movement direction. The selection controlling module 206 determines one of the second UI components as the active second UI component, according to a predetermined parameter. In this embodiment, the predetermined parameter can be a frequency of use, an earlier installation time or a recently used recording, or the like. For example, the selection controlling module 206 can determine the second UI component B32 as the active second UI component, from a high frequency of use of the application program associated to the second UI component B32.

Figure 12:
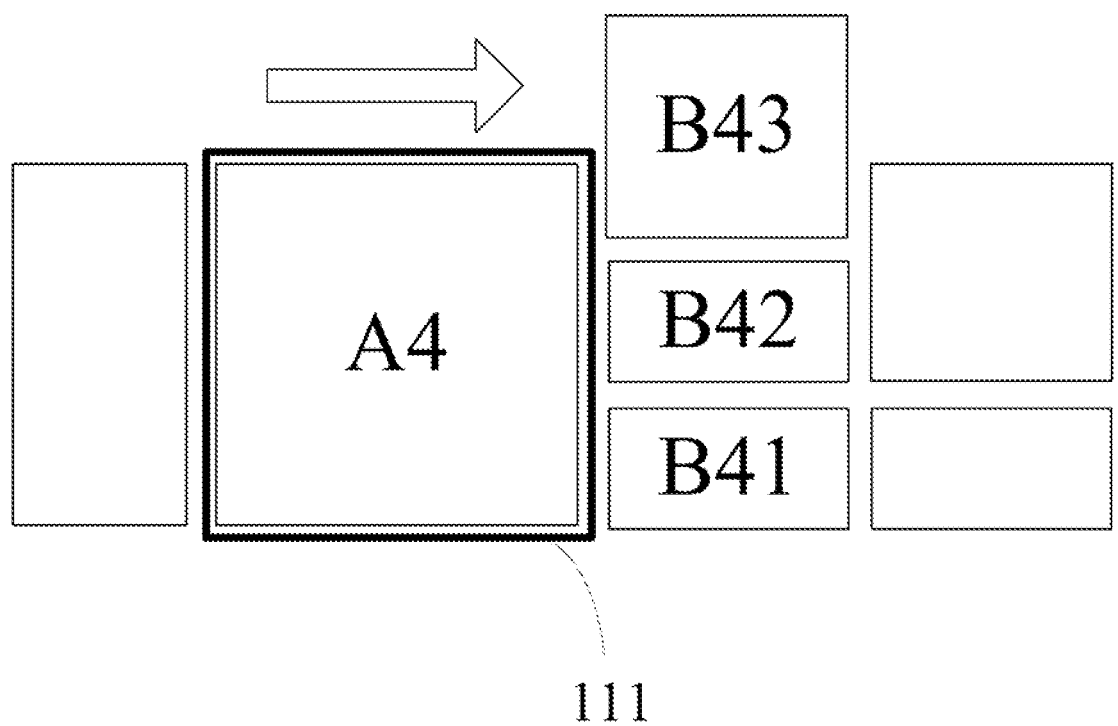
FIG. 12 is a diagrammatic view of an embodiment of a fourth moving process of the selection box.

FIG. 12 illustrates that in a fourth embodiment, the first UI component A4 is framed by the selection box 111 at present, more than one second UI components 13 are adjacent to the first UI component A4 consisting in the movement direction. For example, as shown in FIG. 12, a second UI component B41, a second UI component B42 and the second UI component B43 are adjacent to the first UI component A2 consisting in the movement direction.

The selection controlling module 206 determines the overlap ratios between the first UI component A2 and each of the second UI components, and obtains number of the second UI components having the largest overlap ratio. When the selection controlling module 206 determines the number of the second UI components having the largest overlap ratio is more than one, the selection controlling module 206 further determines one of the second UI components having the largest overlap ratio as the active second UI component, according to a predetermined parameter.

In other embodiments, if the selection box 111 determines the first UI component at present, more than one second UI components are adjacent to the first UI component consisting in the movement direction. The selection controlling module 206 determines whether the second UI component is a matched second UI component according to a predetermined parameter. When the number of the matched second UI component is more than one, the selection controlling module 206 determines one of the matched second UI components as the active second UI component, according to overlap ratios between the first UI component and each of the matched second UI components.

When the active second UI component is determined, the UI controlling module 202 controls the display center of the dynamic map-type graphic interface 12 to move to a center of the active second UI component, then controls the display unit 10 to display a partial region of the dynamic map-type graphic interface 12 around the center of the active second UI component.

Figure 13:
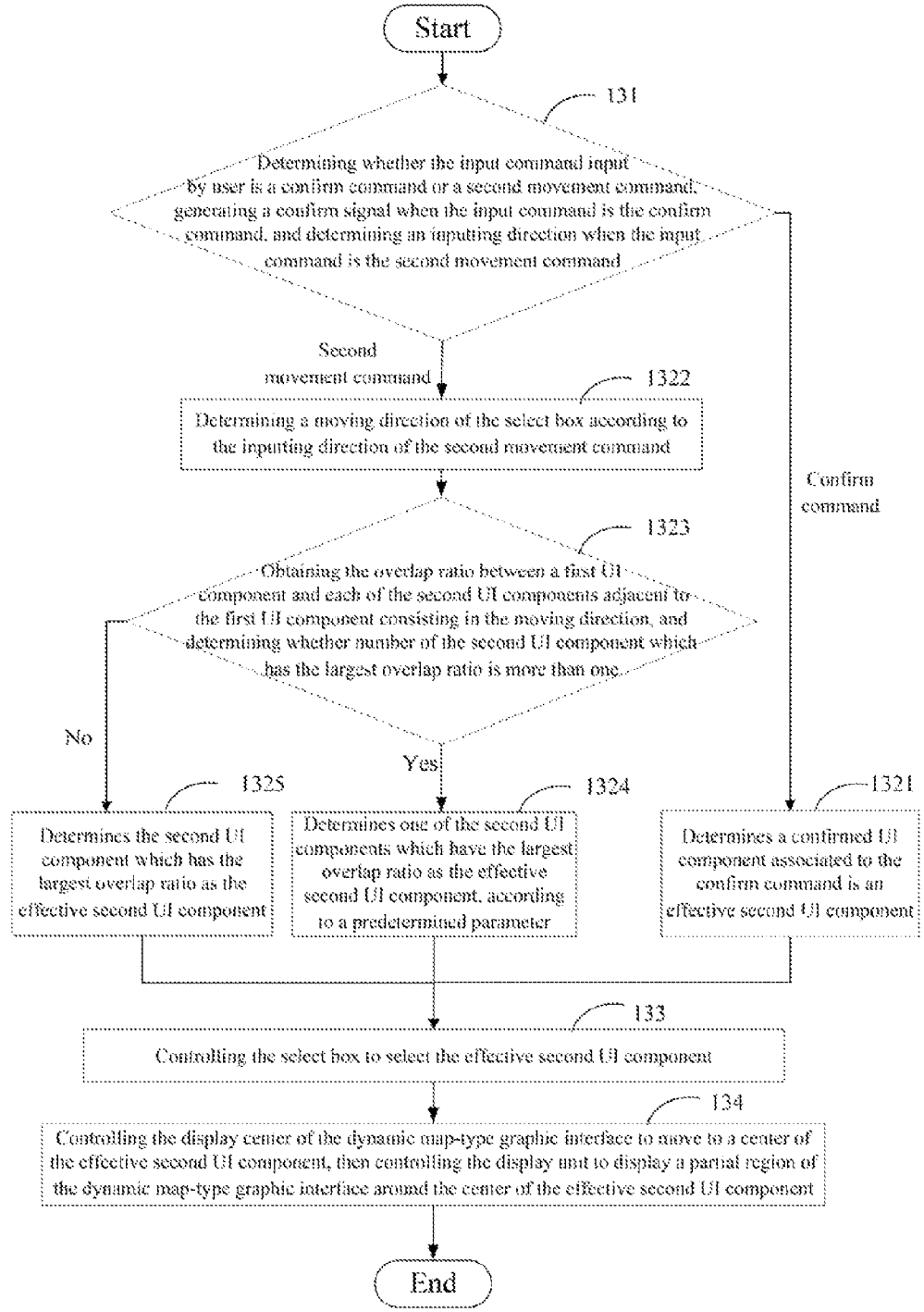
FIG. 13 is a flowchart of an embodiment of a control method for controlling a selection box of the electronic device employing the dynamic map-type graphic interface.

FIG. 13 illustrates a flowchart of a method for controlling the selection box 111 displayed on the electronic device 100.

In block 131, the input controlling module 205 determines whether the input command input by user is a confirm command or a second movement command, then a confirm signal is generated when the input command is the confirm command, and determines an input direction of the second movement command when the input command is the second movement command. When the input command is the confirm command, the flow goes to block 1321; when the input command is the second movement command, the flow goes to block 1322.

In block 1321, the selection controlling module 206 determines a confirmed UI component associated with the confirm command is an active second UI component. For example, if the input unit 30 is a touch screen, when the user touches the touch screen, the input unit 30 generates the confirm command, the selection controlling module 206 controls the selection box 111 to frame the UI component coupled to the touch point.

In block 1322, the selection controlling module 206 determines a movement direction of the selection box 111, according to the input direction of the second movement command.

In block 1323, the selection controlling module 206 obtains the overlap ratio between a first UI component currently selected by the selection box 111 and each of the second UI components adjacent to the first UI component in the movement direction, and determines whether number of the second UI component having the largest overlap ratio is more than one. If yes, goes to block 1324; if no, goes to block 1325.

In block 1324, the selection controlling module 206 determines one of the second UI components having the largest overlap ratio as the active second UI component, according to a predetermined parameter. The predetermined parameter can be a high frequency of use, an earlier installing time or a recently used recording, or the like.

In block 1325, the selection controlling module 206 determines the second UI component having the largest overlap ratio as the active second UI component.

In block 133, the selection controlling module 206 controls the selection box 111 to frame the active second UI component.

In block 134, the UI controlling module 202 controls the display center of the dynamic map-type graphic interface 12 to move to a center of the active second UI component, then controls the display unit 10 to display a partial region of the dynamic map-type graphic interface 12 around the center of the active second UI component. In other embodiments, the block 134 is not needed.

In the embodiment, a user can switch between the first controlling mode and the second controlling mode to browse the dynamic map-type graphic interface 12 via the input unit 30.

The dynamic map-type graphic interface 12 is a single-layer graphic interface made up of the UI components 13 spliced together. The UI components 13 are dynamically arranged around the center O. Furthermore, the dynamic map-type graphic interface 12 is compatible with different electronic devices having different display sizes.

The embodiments shown and described above are only examples. Many details are often found in the art such as the other features of a protection case. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for dynamically controlling a map-type graphical user interface comprising:
    determining, at an electronic device, a first and second movement commands;
    determining, at the electronic device, an input direction of the first and second movement commands;
    determining, at the electronic device, a movement direction of a selection box, according to the input direction of the second movement command;
    obtaining, at the electronic device, an overlap ratio between a first UI component currently selected by the selection box and each of a second UI components adjacent to the first UI component;
    determining, at the electronic device, whether more than one of the second UI components has the largest overlap ratio;
    determining, at the electronic device, an active second UI component according to a predetermined parameter, when the number of the second UI components having the largest overlap ratio is more than one;
    determining, at the electronic device, the second UI component having the largest overlap ratio as the active second UI component, when the number of the second UI components having the largest overlap ratio is one; and
    controlling, at an electronic device, the selection box to select the active second UI component.

2. The method of claim 1, further comprising:
    determining, at the electronic device, whether the input command input by user is a confirm command, and generating a confirm signal when the input command is the confirm command; and
    determining, at the electronic device, a confirmed UI component associated to the confirm command is an active second UI component.

3. The method of claim 1, further comprising:
    controlling, at the electronic device, a display center of the dynamic map-type graphic interface to move to a center of the active second UI component;
    controlling a display unit of the electronic device to display a partial region of the dynamic map-type graphic interface centered around the center of the active second UI component, wherein a size of the first partial region is the size of the display unit.

4. The method of claim 1, wherein the UI components comprises a plurality of application icons, each of the application icons is associated with a corresponding application program.

5. The method of claim 1, wherein the predetermined parameter is a frequency of use, an earlier installation time or a recently used recording.

6. An electronic device, comprising:
    a display unit;
    a processing unit; and
    a storing unit configured to store a plurality of application programs and user interface (UI) components associated with the application programs, and a dynamic map-type graphic interface made up of the UI components spliced together around a center and comprised a selection box to select the UI components;
    wherein the storing unit is further configured to store a plurality of instructions, which when executed by the processing unit, causes the processing unit to:
    determining, at an electronic device, a first and second movement commands;
    determining, at the electronic device, an input direction of the first and second movement commands;
    determining, at the electronic device, a movement direction of a selection box, according to the input direction of the second movement command;
    obtaining, at the electronic device, an overlap ratio between a first UI component currently selected by the selection box and each of a second UI components adjacent to the first UI component;
    determining, at the electronic device, whether more than one of the second UI components has the largest overlap ratio;
    determining, at the electronic device, an active second UI component according to a predetermined parameter, when the number of the second UI components having the largest overlap ratio is more than one;
    determining, at the electronic device, the second UI component having the largest overlap ratio as the active second UI component, when the number of the second UI components having the largest overlap ratio is one; and
    controlling, at an electronic device, the selection box to select the active second UI component.

7. The electronic device of claim 6, wherein when the instructions executed by the processing unit, further causes the processing unit to:
    determining, at the electronic device, whether the input command input by user is a confirm command, and generating a confirm signal when the input command is the confirm command; and
    determining, at the electronic device, a confirmed UI component associated to the confirm command is an active second UI component.

8. The electronic device of claim 6, wherein when the instructions executed by the processing unit, further causes the processing unit to:

controlling, at the electronic device, a display center of the dynamic map-type graphic interface to move to a center of the active second UI component;

controlling a display unit of the electronic device to display a partial region of the dynamic map-type graphic interface centered around the center of the active second UI component, wherein a size of the first partial region is the size of the display unit.

9. The electronic device of claim 6, the UI components comprises a plurality of application icons, each of the application icons is associated with a corresponding application program.

10. The electronic device of claim 6, wherein the predetermined parameter is a frequency of use, an earlier installation time or a recently used recording.

11. A controlling system for controlling a dynamic map-type graphic interface of an electronic device, the dynamic map-type graphic interface comprising a plurality of user interface (UI) components spliced together around a center and a selection box to select the UI components; the controlling system comprising:

a processing unit;

a storing unit storing a number of modules, which are a collection of software instructions that can be respectively executed by the processing unit, the modules comprising:

an input controlling module executed by the processing unit to cause the processing unit to determine, at an electronic device, a first and second movement commands, and determine an input direction of the first and second movement commands;

a selection controlling module executed by the processing unit to cause the processing unit to:

determine, at the electronic device, a movement direction of a selection box according to the input direction of the second movement command, obtain, at the electronic device, an overlap ratio between a first UI component currently selected by the selection box and each of a second UI components adjacent to the first UI component, and determine whether more than one of the second UI components has the largest overlap ratio;

determine, at the electronic device, an active second UI component according to a predetermined parameter, when the number of the second UI components having the largest overlap ratio is more than one; and determine, at the electronic device, the second UI component having the largest overlap ratio as the active second UI component, when the number of the second UI components having the largest overlap ratio is one; and a UI controlling module executed by the processing unit to cause the processing unit to control, at an electronic device, the selection box to select the active second UI component.

12. The controlling system of claim 11, wherein the selection controlling module is further executed by the processing unit to cause the processing unit to:

determine, at the electronic device, whether the input command input by user is a confirm command, and generating a confirm signal when the input command is the confirm command; and determine, at the electronic device, a confirmed UI component associated to the confirm command is an active second UI component.

13. The controlling system of claim 11, wherein the UI controlling module is further executed by the processing unit to cause the processing unit to control, at the electronic device, a display center of the dynamic map-type graphic interface to move to a center of the active second UI component, and control a display unit of the electronic device to display a partial region of the dynamic map-type graphic interface centered around the center of the active second UI component, wherein a size of the first partial region is the size of the display unit.

14. The controlling system of claim 11, wherein the UI components comprises a plurality of application icons, each of the application icons is associated with a corresponding application program.

15. The controlling system of claim 11, wherein the predetermined parameter is a frequency of use, an earlier installation time or a recently used recording.

* * * * *